324-77 SR
1-29-74 XR 3,789,323

[11] 3,789,323

Andersen et al. [45] Jan. 29, 1974

[54] MULTIPLE INPUT SIGNAL MODULATOR AND METHOD THEREFOR

[75] Inventors: Robert A. Andersen, Los Altos Hills; Lawrence A. Maguire, San Jose, both of Calif.

[73] Assignee: Sigmatek, Inc., Cupertino, Calif.

[22] Filed: May 19, 1972

[21] Appl. No.: 255,139

[52] U.S. Cl. .............. 332/18, 179/15 BT, 324/77 E
[51] Int. Cl. .......................... G01r 23/16, H04j 3/04
[58] Field of Search .. 332/20, 18, 21, 23; 324/77 B, 324/77 E, 57 E, 57 H; 325/363, 472, 473; 179/15 BT

[56] References Cited

UNITED STATES PATENTS

| | | | |
|---|---|---|---|
| 3,009,105 | 11/1961 | Goodall | 324/77 E |
| 3,257,511 | 6/1966 | Adler et al. | 179/15 BT |
| 3,280,260 | 10/1966 | Boothroyd et al. | 179/15 BT |
| 3,714,566 | 1/1973 | Kang | 324/77 E |

*Primary Examiner*—Alfred L. Brody
*Attorney, Agent, or Firm*—Flehr, Hohbach, Test, Albritton & Herbert

[57] ABSTRACT

A frequency modulator for either stereo or quadraphonic FM which in addition to summing the sampled audio inputs, also sums continuous fractions of the audio inputs to form the composite signal which modulates the carrier frequency. The fractions of audio inputs which are continuously coupled are adjusted to provide for optimum separation while allowing filter adjustment for optimum phase linearity. A predistortion network for the modulator-oscillator circuit maintains the high separation achieved by the foregoing adjustment.

16 Claims, 7 Drawing Figures

PATENTED JAN 29 1974

3,789,323

MULTIPLE INPUT SIGNAL MODULATOR AND METHOD THEREFOR

BACKGROUND OF THE INVENTION

The present invention is directed to a multiple input signal modulator and more specifically to a frequency modulator which may be used in a frequency modulation alignment system.

As disclosed in U.S. Pat. No. 3,628,134 in the name of Robert A. Andersen and assigned to the present assignee, a frequency modulation alignment system, for example, for testing a stereo FM type receiver, requires a frequency modulator. Moreover, the characteristics of that modulator are crucial in providing an adequate alignment system. This is especially true where broadcast quality is desired at high audio frequencies. In addition, a new system is now being proposed to the Federal Communications Commission which is quadraphonic. The requirements for a frequency modulator to produce a quadraphonic signal are even more severe because of the necessarily higher side band frequencies involved.

As will be discussed in detail below, a major difficulty in providing an FM modulator which provides good linearity with adequate channel separation is the inherent limitation in the shaping of the band limiting filter which is necessary in such a configuration. In general, the band limiting filter is necessary since the Federal Communications Commission (FCC) limits the bandwidth of any given FM channel. It is known that an ideal filter characteristic will include a step as for example, illustrated in FIG. 4, which represents the typical filter characteristic in a prior art stereo FM modulator. The pilot frequency of 19KHz which is specified as $\omega/2$ is, of course, a broadcasting standard. The frequency $\omega$ or 38KHz is in effect a framing frequency which determines the sampling rate of the stereo channel audio input signals which are to be modulated. As illustrated in FIG. 4, and assuming a 15KHz bandwidth the upper side band would extend to 53KHz and the lower side band to 23KHz. As will be explained in greater detail below, if the composite sampled signal in the modulator is analyzed from the standpoint of Fourier analysis, it will be found that the d.c. component will have a lower amplitude than the first harmonic component. This is with reference to a stereo type modulation. Normally this difference in amplitude would be compensated for by the third and higher harmonic components. However, because of bandwidth limitations, this cannot be included in the composite signal and this is the reason for the band limiting filter. Thus, in order to equalize the two amplitudes which must be done for good linearity and stereo separation a stepped filter has been used in the past with the step ideally occurring within the 15 to 23KHz range. However, in the curve illustrated in FIG. 4, since there is still a slope occurring above the 23KHz frequency, this will cause distortion and reduce separation.

One solution to the foregoing problem where a broadcast quality stereo modulator is desired either for broadcasting itself or for use in a FM alignment testing system, is to in addition to sampling the input audio signals to continuously feed the same multiple signals to the same summing junction. In combination with this feature is used a band limiting filter which has a flat characteristic. The amount of continuous signal being fed to the summing junction compensates for the unequal amplitudes of the d.c. and first harmonic components. It is believed that this type of system is now present in a testing device marketed by a Danish corporation, Radiometer A/C, at Emdrupzej 72 Street, Copenhagen, N.V., Denmark, under the trademark "Radiometer type SMG-1." However, this device still does not provide for optimum linearity and channel separation as does the present invention.

OBJECT AND SUMMARY OF THE INVENTION

It is, therefore, an object of the invention to provide a modulator for multiple input signals which is highly linear and provides for significant separation of audio channels.

In accordance with the foregoing object there is provided a multiple input signal frequency modulator including summing means. Switch means sequentially sample the multiple signals and couple the sampled signals to the summing means. Fractions of each of the multiple signals are continuously coupled to the summing means. The sampled signals in combination with the continuously coupled signals form a composite signal at the summing means. From the standpoint of Fourier analysis the composite signal has a d.c. component and higher harmonic components. Band limiting filter means reject a predetermined harmonic component and higher harmonics. The fractions are valued to increase the magnitude of the d.c. component to compensate for the missing harmonics of the composite signal eliminated by the filter means. Modulator-oscillator means are provided. Predistortion means couple the output of the filter means to the modulator-oscillator means for compensating for any nonlinearity in the modulator-oscillator means.

DETAILED DESCRIPTION OF THE PREFERRED EMBODIMENT

Figures 1, 2, 3:
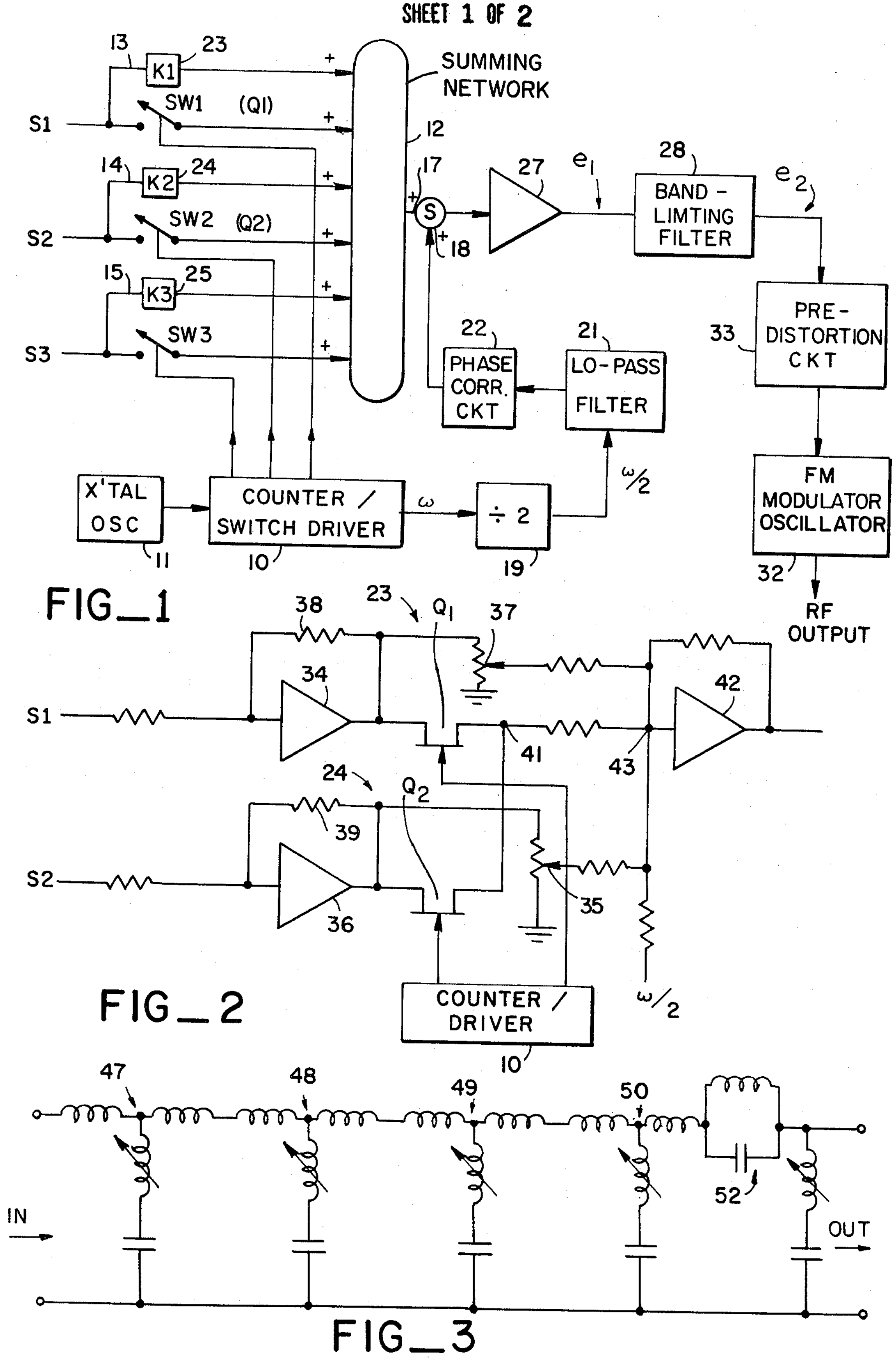
FIG. 1 is a block diagram of the circuit embodying the present invention.
FIG. 2 is a detailed circuit schematic of a portion of FIG. 1.
FIG. 3 is a detailed circuit schematic of another portion of FIG. 1.

Referring to FIG. 1, a generalized frequency modulator is illustrated having multiple input signals which include S1, S2, S3, etc. These would, of course, normally be audio type information signals. The input signals are sequentially sampled by the switches designated SW1, SW2, SW3 which are actually field effect transistors. The switches are driven by a counter-switch-drive 10 which is timed by a crystal oscillator 11 at a frame frequency, $\omega$, which in the case of stereo FM is 38KHz or double the pilot frequency. A summing network 12 sums both the sequentially sampled input signals and also continuously sums a fraction of each input signal which are continuously coupled to the summing network 12. The continuous coupling is indicated by lines 13, 14 and 15 and the fraction which is coupled is indicated by $K_1$ through $K_3$ of the bypass units 23, 24 and 25. Thus, a composite signal is formed at the summing network 12 at its output 17. At this point an additional summing network 18 adds a pilot signal of 19KHz or $\omega/2$. This is derived from the counter-switch-driver 10 by dividing the switch driver signal $\omega$ by 2 as shown by 19, passing it through a low pass filter 21, and correcting for phase at 22 so that each zero crossing will represent the beginning of a time period T where T is equal to $2\pi/\omega$.

The complete set of input signals is sampled in this time period T. It is, of course, assumed that the frequency of the input signals S1 through S3 etc. is less than one half the frame frequency $\omega$. In the actual FM stereo situation, this would, of course, be true since the highest side band frequency is normally 15KHz. The amount of continuous bypass of the switches which is performed by the bypass units 23, 24 and 25 is adjustable in a manner to be described below.

The output of the summing junction 18 is coupled into an amplifier 27 to produce a signal $e_1$ which can in the two input case be represented by a Fourier series as shown by equation (1).

$$e_1(t)=\frac{K_1S1+K_2S2+S1+S2}{2}+\frac{2}{\pi}(S1-S2)\,\text{Sin}\,\omega t \quad (1)$$
$$+\frac{2}{3\pi}(S1-S2)\,\text{Sin}\,3\omega t+\frac{2}{5\pi}(S1-S2)\,\text{Sin}\,5\omega t+\ldots$$

As discussed previously, since the FCC requires the bandwidth of the modulating signal of a radio frequency carrier to be restricted, a band limiting filter 28 is provided which eliminates all harmonics above the first harmonic; since there is no second harmonic the third harmonic and higher harmonics are eliminated. As also discussed above, after the bandwidth is restricted, it must be possible to receive and reconstitute each of the original input signals, S1, S2 in the stereo version of the present invention with low distortion and low crossover error. Crossover error is defined as one input being interpreted as part of another and vice versa. Thus, after filtering by the band limiting filter 28 a signal $e_2$ is produced which has the format as shown by equation (2).

$$e_2(t)=(K_1+1)\,S1+(K_2+1)\,S2/2+2/\pi\,(S1-S2)\,\text{Sin}\,\omega t \quad (2)$$

Figure 4:
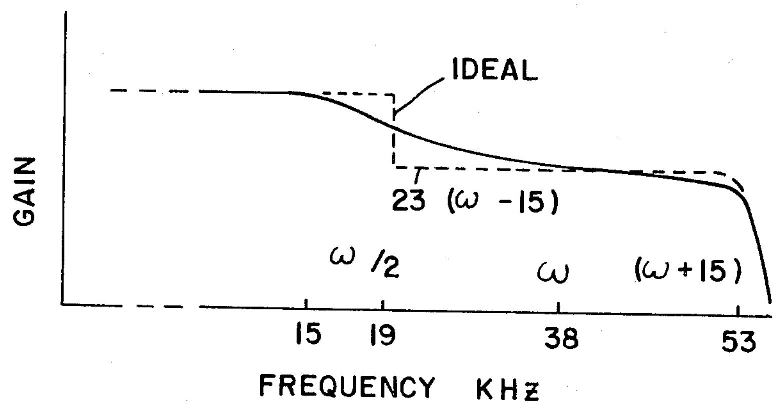
PRIOR ART FIG 4
FIGS. 4, 5 and 6 are characteristic curves useful in understanding the present invention.
Figure 5:
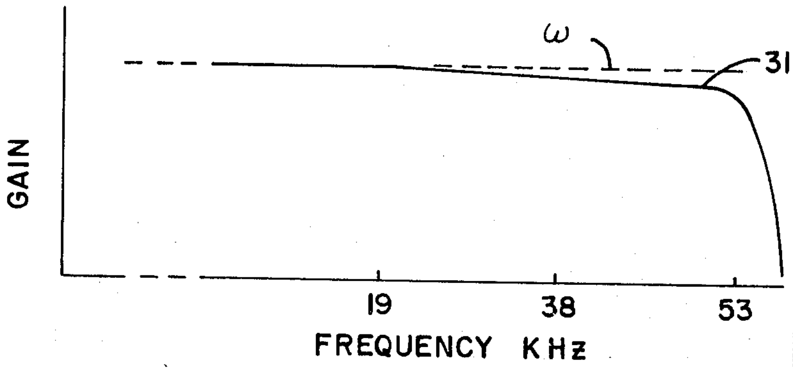

The first term of the equation is termed a d.c. component, although it is truly time varying since S1 and S2 are both time varying audio signals, and the second part of the equation is the first harmonic, $\omega$. Because of the absence of the third and higher harmonics the amplitude of the first harmonic is higher than the d.c. component amplitude. This relationship is apparent by the coefficients of ½ and $2/\pi$; in other words, $2/\pi$ is greater than ½ by approximately 27%. However, this can be equalized as discussed in connection with the prior art and as illustrated in FIG. 4 by shaping the filter characteristic. This produces some distortion and is not suitable for broadcast quality stereo modulation. If instead the filter has essentially a flat characteristic as illustrated in FIG. 5, then the value of the Ks can be adjusted to compensate for this difference. Thus, assuming with perfect input switches $K_1 = K_2$, then as illustrated in equation (3)

$$(K_1+1)\,½=2/\pi \quad (3)$$

The quantity $K_1 + 1$ must account for this 27% difference and thus $K_1$ is equal to $$K_1+K_2=4/\pi-1\cong 0.27 \quad (4)$$

and equation (2) becomes $$e_2(t)=2/\pi\,[(S1+S2)+(S1-S2)\,\text{Sin}\,\omega t] \quad (5)$$

Examination of equation (5) reveals that if $t$ = T/4 or 90° the composite signal is exclusively $4/\pi\cdot$S1 and at $t$ = 3T/4 the composite signal is $4/\pi\cdot$S2.

As discussed previously, the valuing of the fraction K to produce equalization in Fourier terms has been accomplished previously in a "Radiometer" device. However, with such a circuit a severe burden is placed on the band limiting filter 28 since it must reject the third harmonic, $3\omega$, and its side bands, and must have linear phase and constant gain at all the frequencies of S1 and S2 and the side bands of $\omega$. By linear phase is meant a constant time delay for all the components of the composite or complex signal.

In accordance with the present invention, a more linear phase can be obtained by adjustment of the rolloff amplitude response of the filter. This is illustrated in FIG. 5 where at the higher frequencies a rolloff is indicated at 31. This rolloff adjustment, however, causes the response to be lower at frequencies around $\omega$. This can be corrected by adjustment of $K_1$ and $K_2$. Thus, optimum separation of the stereo input signals can be provided by, in a successive approximation mode, adjusting $K_1$ and $K_2$ to provide for optimum separation in conjunction with the adjustment of the filter 28 to provide for optimum phase linearity.

From a practical standpoint, with this successive approximation mode of adjustments crosstalk figures of below 60dB at 1KHz, 50dB at 12KHz and 46dB at 15KHz have been achieved. In addition, the adjustment of $K_1$ and $K_2$ compensate for variations in the switches SW1 and SW2 since in practice they are solid state devices and their leakage varies in the off state; also their resistance in the on state varies. Providing the adjustment feature in the bypass networks 23 and 24 allows for such variations.

Referring to FIG. 1, the output of the band limiting filter $e_2$ is coupled to an FM modulator-oscillator 32 to produce an R.F. output through a predistortion circuit 33. As described in the above mentioned Andersen patent, the purpose of the predistortion circuit is to compensate for the nonlinearity in the modulator-oscillator means. The use of such a predistortion circuit is especially critical in terms of the present invention since for good separation at the R.F. output, a very low distortion is necessary to prevent the production of third harmonics. In previous circuits for modulating FM type signals which did not have the feature of the adjustable bypass of the input audio signal by way of $K_1$, $K_2$, $K_3$, etc. the crosstalk levels were sufficiently high that the need for a very linear modulator was not realized. However, with the low crosstalk levels produced by the present invention a predistortion circuit is absolutely necessary to obtain the benefit of these low crosstalk levels.

FIG. 2 shows in greater detail the bypass circuits 23 and 24, summing networks 12 and 18 and the switches SW1 and SW2. These switches as discussed above are field effect transistors Q1 and Q2. The bypass networks include operational amplifiers 34 and 36 which couple the input signals S1 and S2 to switches Q1 and Q2. Bypass network 23 includes a variable potentiometer 37 coupled to the feedback resistor 38 of operational amplifier 34. Bypass network 24 includes a potentiometer 35 similarly coupled to the feedback resistor 39 of operational amplifier 36. Transistors Q1 and Q2 have their gate inputs driven by counter-switch-driver unit 10.

The outputs of the field effect transistors are coupled together at the point 41 which in turn is coupled to an operational amplifier 42 having a high input impedance at the input summing point 43. Also coupled to this point through appropriate resistors are the outputs of potentiometers 35 and 37, which provide the fractions $K_1$ and $K_2$ of signals S1 and S2, along with the pilot signal $\omega/2$. Operational amplifiers 34 and 36 have low output impedances. Thus, leakage through an off or open field effect transistor switch is absorbed through the associated low output impedance transistor switch and its associated low output impedance operational amplifier.

FIG. 3 illustrates band limiting filter 28 in detail and includes T networks 47, 48, 49 and 50, having inductors, a capacitor and an adjustable inductance for providing the rolloff as illustrated in FIG. 5 which in turn provides a linear phase relationship. A slot type filter 52 provides for good rejection of the third harmonic component.

Figure 6:
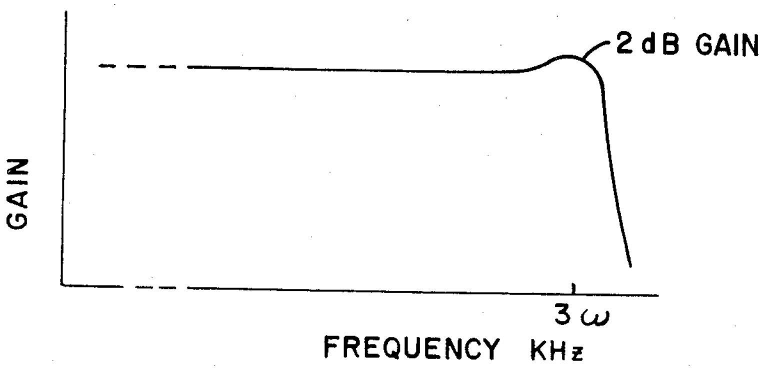

In the case where a quadraphonic input signal is present, the filter 28 would exclude the fifth and higher order harmonics of the composite signal. However, as illustrated in FIG. 6, since there is no fourth harmonic present, the filter cutoff would occur at the third harmonic $3\omega$. It has been found that crosstalk distortion is reduced if the filter has an approximately 2dB gain at $3\omega$, or if the filter has an approximately 0.5dB loss at $2\omega$, compared to its response at the remaining frequencies. The K fractions would, of course, be adjusted to compensate for these variations. The foregoing are typical variations in filter shaping. Each filter is somewhat unique and thus must be shaped individually—this is accomplished in a successive approximation mode where the K fractions are also adjusted for optimum separation.

Figure 7:
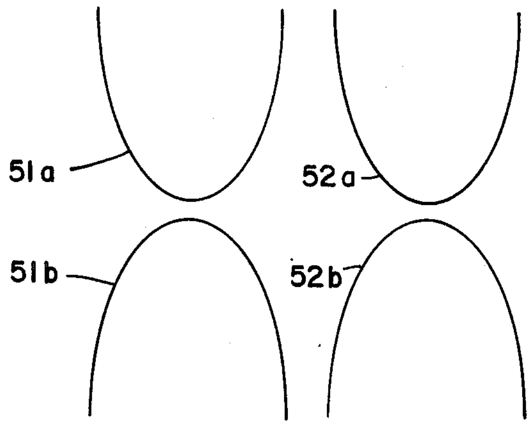
FIG. 7 is an oscilloscope display useful in understanding the present invention.

One technique of adjustment which would be used in conjunction with the frequency modulation alignment system shown in the above Andersen patent is to provide an oscilloscope presentation as illustrated in FIG. 7 of opposing cusps which are illustrated as the pairs 51*a*, 51*b* and 52*a*, 52*b*. The technique includes synchronizing an oscilloscope which produces this display shown in FIG. 7 on the 19KHz pilot carrier with the sweep speed set to 1 microsecond per centimeter. The opposing zero cusps appear at 26.3 microsecond intervals which amount to a 38KHz period; i.e. double the pilot frequency of 19KHz. These "zero" points occur at the instant the composite waveform would be sampled to determine the voltage at one of the audio inputs. Switching the phase of the inputs provides for the display of the other input. To optimize separation over the full frequency range, the cusp pair should be made symmetrical and just touching at their centers. Thus, in the method of the present invention in a successive approximation mode the K fractions would be adjusted along with the filtering adjustments as illustrated in FIG. 3 to optimize the oscilloscope presentation in FIG. 7.

Thus, the present invention has provided an improved frequency modulator of broadcast quality which has improved channel separation with low crosstalk.

We claim:

1. A multiple input signal modulator comprising: summing means; switch means for sequentially sampling said multiple signals and coupling the sampled signals to said summing means, means for continuously coupling fractions of each of said multiple signals to said summing means, the sampled signals in combination with the continuously coupled signals forming a composite signal at said summing means said composite signal from the standpoint of Fourier analysis having a d.c. component and higher harmonic components; band limiting filter means for rejecting a predetermined harmonic component and higher harmonics, said fractions being valued to increase the magnitude of said d.c. component to compensate for the missing harmonics of said composite signal eliminated by said filter means, modulator-oscillator means; and predistortion means coupling the output of said filter means to said modulator oscillator means for compensating for any nonlinearity in said modulator-oscillator means.

2. A modulator as in claim 1 where said magnitude of said d.c. component is increased to substantially equal the first harmonic component of said composite signal.

3. A modulator as in claim 1 where said switch means include solid state devices together with counter means driven by a crystal oscillator for driving said switch means at a frame frequency, $\omega$.

4. A modulator as in claim 3 together with means for providing a pilot signal to said summing means including divider means for dividing $\omega$ by 2, low-pass filter means for filtering $\omega/2$, and phase correction means for adjusting the phase of said filtered $\omega/2$ to said frame frequency, $\omega$.

5. A multiple input signal system for producing a composite filtered signal comprising: summing means; switch means for sequentially sampling said multiple signals and coupling the sampled signals to said summing means; means for continuously coupling fractions of each of said multiple signals to said summing means, the sampled signals in combination with the continuously coupled signals forming a composite signal at said summing means said composite signal from the standpoint of Fourier analysis having a d.c. component and higher harmonic components; band limiting filter means for rejecting a predetermined harmonic component and higher harmonics, said fractions being valued to increase the magnitude of said d.c. component to compensate for the missing harmonics of said composite signal eliminated by said filter means, said continuous coupling means including individual adjustment means, said filter means having a shaped response to vary the amplitudes of one or more allowed harmonic components for optimum phase linearity said fractions being adjusted to provide for optimum separation of said input signals said filter means having an output of said composite filtered signal.

6. A system as in claim 5 together with modulator-oscillator means coupled to the output of said filter means and predistortion means series coupled between said modulator-oscillator means and said output of said filter means for compensating for any nonlinearity in said modulator-oscillator means.

7. A system as in claim 5 where said switch means include solid state devices together with counter means driven by a crystal oscillator for driving said switch means at a frame frequency, $\omega$.

8. A system as in claim 7 where said solid state devices are field effect transistors.

9. A system as in claim 7 together with means for providing a pilot signal to said summing means including divider means for dividing $\omega$ by 2, low-pass filter means for filtering $\omega/2$, and phase correction means for adjusting the phase of said filtered $\omega/2$ to said frame frequency, $\omega$.

10. A system as in claim 5 where there are stereo input signals and said shaping includes rolloff of said filter means at its higher frequency end.

11. A system as in claim 5 where said fractions are also adjusted to compensate for variations in the coupling efficiency of said switch means.

12. A system as in claim 8 together with operational amplifiers having a low output impedance for coupling said input signals to said field effect transistors (FETs) said summing means including an operational amplifier having a high input impedance at its input to which said transistors are coupled whereby leakage through an open FET switch is absorbed through a closed FET switch and its associated low output impedance operational amplifier.

13. A system as in claim 5 where there are four input signals and said filter means rejects fifth and higher harmonic components.

14. A system as in claim 13 where said shaping includes a 2dB gain at the third harmonic component.

15. A system as in claim 13 where said shaping includes a 0.5dB loss at the second harmonic component.

16. A method of producing a composite filtered signal from a plurality of input signals comprising the following steps: sequentially sampling said input signals, summing said sampled signals, continuously summing fractions of said input signals with said sampled signals to form a composite signal which from the standpoint of Fourier analysis has a d.c. component and higher harmonic components, filtering said composite signal to reject a predetermined harmonic component and all higher harmonics, and in a successive approximation mode 1) adjusting said fractions to provide for optimum separation of said input signals, and 2) adjusting said filtering to provide for optimum phase linearity.

* * * * *